United States Patent [19]

Skraba

[11] Patent Number: 4,564,502

[45] Date of Patent: Jan. 14, 1986

[54] APPARATUS FOR MIXING OF FLUIDIZED SOLIDS AND FLUIDS

[75] Inventor: Frank W. Skraba, Sweeny, Tex.

[73] Assignee: Phillips Petroleum Company, Bartlesville, Okla.

[21] Appl. No.: 645,386

[22] Filed: Aug. 29, 1984

[51] Int. Cl.$^4$ .............................. B01J 8/20; B01J 8/22
[52] U.S. Cl. .................................. 422/140; 422/144; 422/145
[58] Field of Search ............... 422/140, 145, 144, 214; 208/127, 157, 158

[56] References Cited

U.S. PATENT DOCUMENTS

| | | |
|---|---|---|
| 2,841,476 | 7/1958 | Dalton . |
| 2,937,988 | 5/1960 | Polack .............................. 208/127 |
| 2,985,517 | 5/1961 | Harper . |
| 3,071,546 | 1/1963 | McMahon ......................... 208/163 |
| 3,152,065 | 10/1964 | Sharp et al. ....................... 422/140 |
| 4,149,964 | 4/1979 | Bartholic .......................... 208/153 |
| 4,310,411 | 1/1982 | Wilkening ......................... 208/153 |

*Primary Examiner*—Barry S. Richman
*Assistant Examiner*—William R. Johnson
*Attorney, Agent, or Firm*—William R. Sharp

[57] ABSTRACT

An apparatus and method for mixing a fluidized solid and a fluid wherein the fluidized solid flows in a space defined between an outer member and an inner member positioned within the outer member. A body means is provided in the space between the members to occupy a predetermined volume in the space. A stream of solid particles flows around the body, and is directed across the upper end of the inner member. Fluid is released at the upper end of the inner member which mixes with the fluidized solid.

20 Claims, 6 Drawing Figures

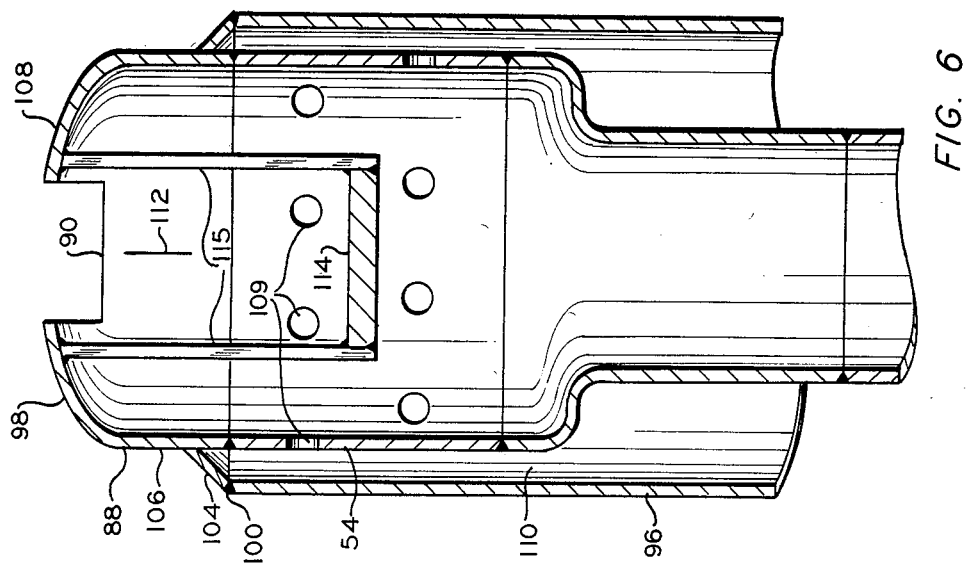
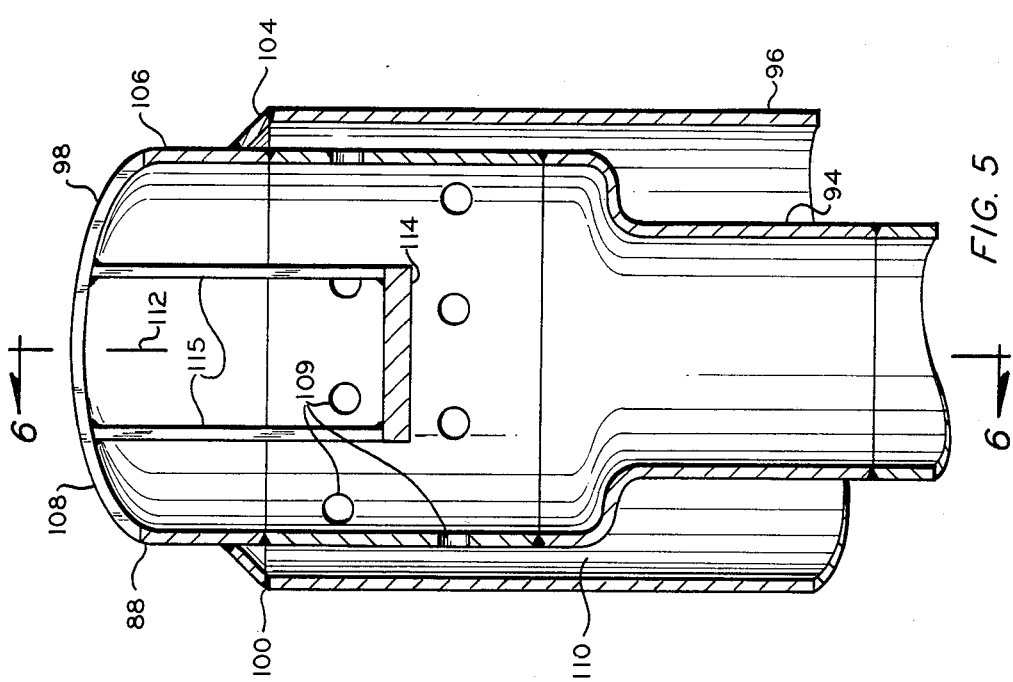

APPARATUS FOR MIXING OF FLUIDIZED SOLIDS AND FLUIDS

In one aspect, the invention relates to an apparatus for mixing fluidized solids and fluids to be contacted therewith. In another aspect, the invention relates to a method of mixing such fluidized solids and fluids.

The invention is particularly suited for use in fluid catalytic cracking units wherein hydrocarbons are cracked in the presence of finely divided or fluidized catalyst particles. However, it will be understood by those skilled in the art that the invention can readily be applied to other systems in which fluidized solids and fluids are to be admixed and fed to a point beyond the point of admixture.

One of the principal problems in the treatment of large quantities of hydrocarbons in the oil refinery today is found at the place at which the hydrocarbon liquid or vapor is contacted with the fluidized catalyst.

In one type of mixing arrangement, catalyst particles flow into an annulus formed between the interior surface of a lift pot and the outside surface of a cartridge member mounted within the lift pot. Oil feedstock and steam are fed by nozzles into a zone just above the upper end of the cartridge member. In this type of system, catalyst flows vertically upward around the cartridge member, and then horizontally above the cartridge member into a zone in which the atomized oil, gases, and catalyst mix. This mixture then passes up a riser reactor in which the catalytic cracking process continues.

Effective mixing of the catalyst and oil is dependent to a large extent on the horizontal velocity of the catalyst at the entrance of the mixing zone. Generally speaking, a higher horizontal catalyst velocity will achieve a better catalyst-oil mixing effect, thereby enabling a more efficient cracking operation. Therefore, it would be desirable to achieve higher horizontal catalyst velocities of, for example, 5-20 ft/sec to achieve a better mixing effect.

SUMMARY OF THE INVENTION

It is, therefore, an object of the present invention to provide an improved mixing zone for catalyst and feedstock in a catalytic cracking unit.

It is a further object of this invention to provide an apparatus and method for feeding catalyst to a mixing zone wherein a relatively high catalyst horizontal velocity is achieved.

The above objects are realized in an apparatus which includes an outer hollow elongated member and an inner elongated member mounted within the outer member such that a space is defined between the interior surface of the outer member and the outer surface of the inner member. A body means is provided for occupying volume in the space. The apparatus further comprises a means for introducing fluidized solid into the space, and a means for directing the fluidizable solid across the upper end of the inner member. A means is also associated with the upper end of the inner member for releasing fluid from the inner member upper end.

In one preferred embodiment, the body means comprises a plurality of elongated filler elements mounted between the outer member and the inner member such that each elongated element extends substantially from the lower ends of the members to the upper end of the outer member, the upper end of the outer member extending above the upper end of the inner member. Additionally, the means for introducing fluidized solid may be nozzles into which are fed fluids by fluid lines which pass through the elements and into the interior of the inner member.

In another aspect of the present invention, the above objects are realized in a method wherein a stream of solid particles are passed longitudinally through an outer hollow elongated member in an annular stream around an inner elongated member positioned in the outer member. The annular stream is passed around a body positioned in a space defined between the outer and inner member, the stream then flowing in a generally radial direction past the upper end of the inner member. Fluid is introduced into the stream of solid particles as the stream is moving radially inwardly from around the periphery of the upper end of the outer member for the formation of a mixture.

In a preferred embodiment, the radial or horizontal velocity is about 5 to about 20 ft/sec, and the solid particles and fluid are admixed in a weight ratio in a range of from about 4:1 to about 10:1. Additionally, the solid particles flow across the upper end of the inner member between nozzles from which fluid is introduced.

As noted above, the present invention may be applied to the cracking of feedstock oil wherein the fluidized solid is a catalyst and the fluid is feedstock oil and an atomizing fluid.

Due to the high catalyst velocities obtained, the catalyst flows well into the center of a mixing zone above the inner member, engulfing the means for introducing oil, or nozzles. Consequently, a uniform, excellent catalyst and oil mixing is achieved. Additionally, by passing oil feed lines through the elements, the lines are protected from hot catalyst particles flowing through the space between the elements.

BRIEF DESCRIPTION OF THE DRAWINGS

FIG. 5 is a cross-sectional view of a portion of the device shown in FIG. 2 which has been enlarged for detail.

FIG. 6 is a cross-sectional view of the device shown in FIG. 5 as it would appear when viewed along lines 6—6.

DESCRIPTION OF THE PREFERRED EMBODIMENTS

An embodiment of the invention will now be described in terms of catalytic cracking.

Figure 1:
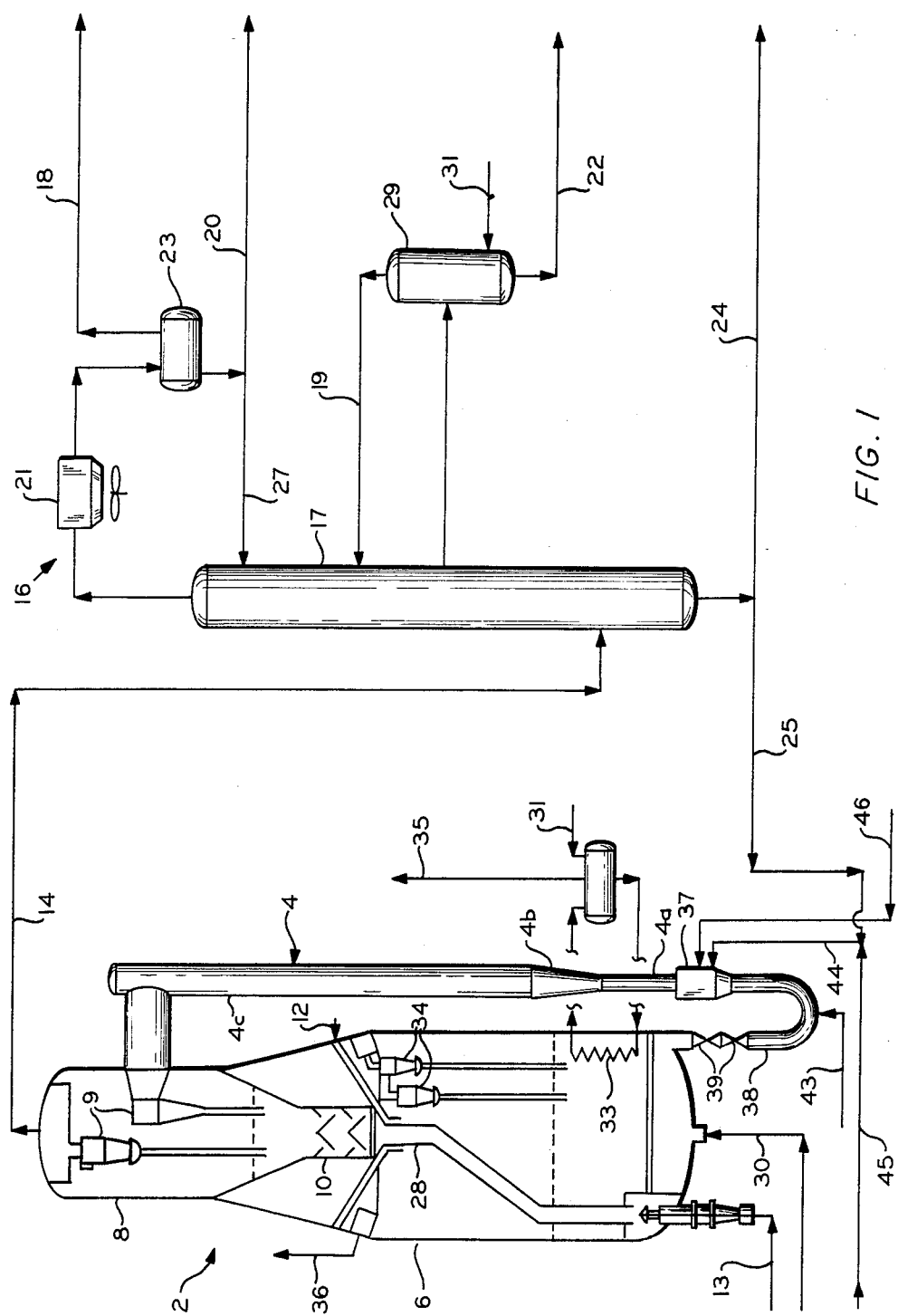
FIG. 1 schematically illustrates one type of cracking unit which includes a lift pot and nozzle assembly wherein oil and catalyst are mixed.

With reference to FIG. 1, one type of fluid catalytic cracking unit (FCCU) 2 comprises a riser-reactor 4, a regenerator 6, a catalyst/product separation zone 8 which usually contains several cyclone separators, and a stripping section or zone 10 in which gas, usually steam such as introduced from lines 12 and 13, strips entrained hydrocarbon from the coked catalyst. As shown, riser-reactor 4 comprises a lower generally cylindrical section 4a, a tapered or generally frustoconical middle section 4b, and an upper generally cylindrical section 4c. Overhead product from the separation zone 8 is conveyed via line 14 to a separation zone 16 including a main fractionator 17. The product can be separated, for example, as follows. Light hydrocarbons uncondensed in condenser 21 can be withdrawn from the zone 16 by the line 18. Gasoline range liquids accumulated in accumulator 23 can be withdrawn by the line 20 or refluxed via line 27. Distillates such as light cycle oils can be withdrawn by the line 22 from stripper 29 after being stripped with steam introduced via line 31. The overhead of light hydrocarbons 19 from the stripper may be recycled to column 17. Finally, bottoms may be withdrawn by line 24 or recycled to the riser by line 25, as desired.

After being stripped in the zone 10, the cracking catalyst is conveyed from the zone 10 to the regenerator 6 by line or standpipe 28 for coke burnoff. In the regenerator 6, molecular oxygen containing gas is introduced by a line 30 which is connected to a source of oxygen-containing gas, usually air. Coke deposits are burned from the catalyst in the regenerator 6 forming an effluent gas which is separated from the catalyst in a plurality of cyclone separators 34. These flue gases are withdrawn from the regenerator 6 by the line 36. Coil 33 in the regenerator 6 is used to convert boiler feed water introduced via line 31 to high pressure steam which is withdrawn via line 35. Coil 33 would not be required if the feed contains only gas oil and no topped crude. Hot regenerated catalyst passes from the regenerator 6 to an outer hollow elongated member, hereinafter denoted as lift pot 37, at the lower end of the riser-reactor 4 by catalyst inlet conduit 38. Inlet conduit 38 provides a source of hot, low carbon containing cracking catalyst particles for the riser-reactor 4. Positioning lift pot 37 above the lower bend in inlet 38 as shown, provides for easy maintenance, and also a shorter catalyst and oil residence time in riser-reactor 4 than if the lift pot was lower such as at the bend in inlet conduit 38.

The catalyst flow rate through the cracking unit is controlled by valves 39 which are positioned in the line 38, preferably in a vertical portion thereof.

In the lift pot 37, catalyst from the conduit 38 is fluidized with a fluidizing gas, usually steam, which is introduced into the lower portion of conduit 38 by line 43. The oil feedstock is introduced into the lift pot 37 via a nozzle assembly, later described, which preferably emits an oil spray axially into the riser-reactor 4 at the lower end thereof. A line 44 connects the nozzle assembly with a source of oil feedstock such as a gas oil and/or topped crude oil feed line 45 and the recycle line 25.

The operating conditions for the riser-reactor 4 and regenerator 6 can be conventional. Usually, the temperature in the riser-reactor 4 will be in the range of from about 850° to about 1050° F. preferably in the range of 925° to 1025° F. for heavy oils. The oil is usually admixed with steam at a weight ratio of oil to steam in the range of from about 6:1 to about 25:1. Pressure in the riser-reactor 7 is usually between about 15 and about 60 psia (pounds per square inch absolute), preferably less than about 25 psia for heavy oils. The cracking catalyst particles generally have a size in the range of from about 20 to about 200 microns, usually between about 40 and 80 microns, preferably principally about 60 microns. Flow velocity upward in the vertical section of the riser-reactor is generally between about 40 and about 120 feet per second in the upper portions. The contact time between the catalyst and oil in the riser-reactor is generally in the range of from about 0.25 to about 4 seconds (based on the number of moles of product at the riser outlet), usually from 1 to about 3 seconds when the oil is injected into the bottom of the riser. Preferably, contact times for heavy oils are less than 2.5 seconds. The regenerator is operated at a temperature typically in the range of from about 1100° to about 1500° F., usually from about 1150° to 1450° F., and is ordinarily provided with sufficient oxygen containing gas to reduce the coke on the catalyst to a level of about 0.5 weight percent or less, preferably less than 0.1 weight percent.

Catalysts suitable for catalytic cracking include silica-alumina or silica-magnesia synthetic microspheres or ground gels and various natural clay-type or synthetic gel-type catalysts. Most preferably, fluidizable zeolite-containing cracking catalysts are employed. Preferred catalysts can contain from about 2 to about 20 percent based on total weight of zeolitic material dispersed in a silica-alumina matrix and have a B.E.T. surface area in the range of 50–500 $m^2/g$ and a particle size chiefly in the range of 40–80 microns.

Figure 2:
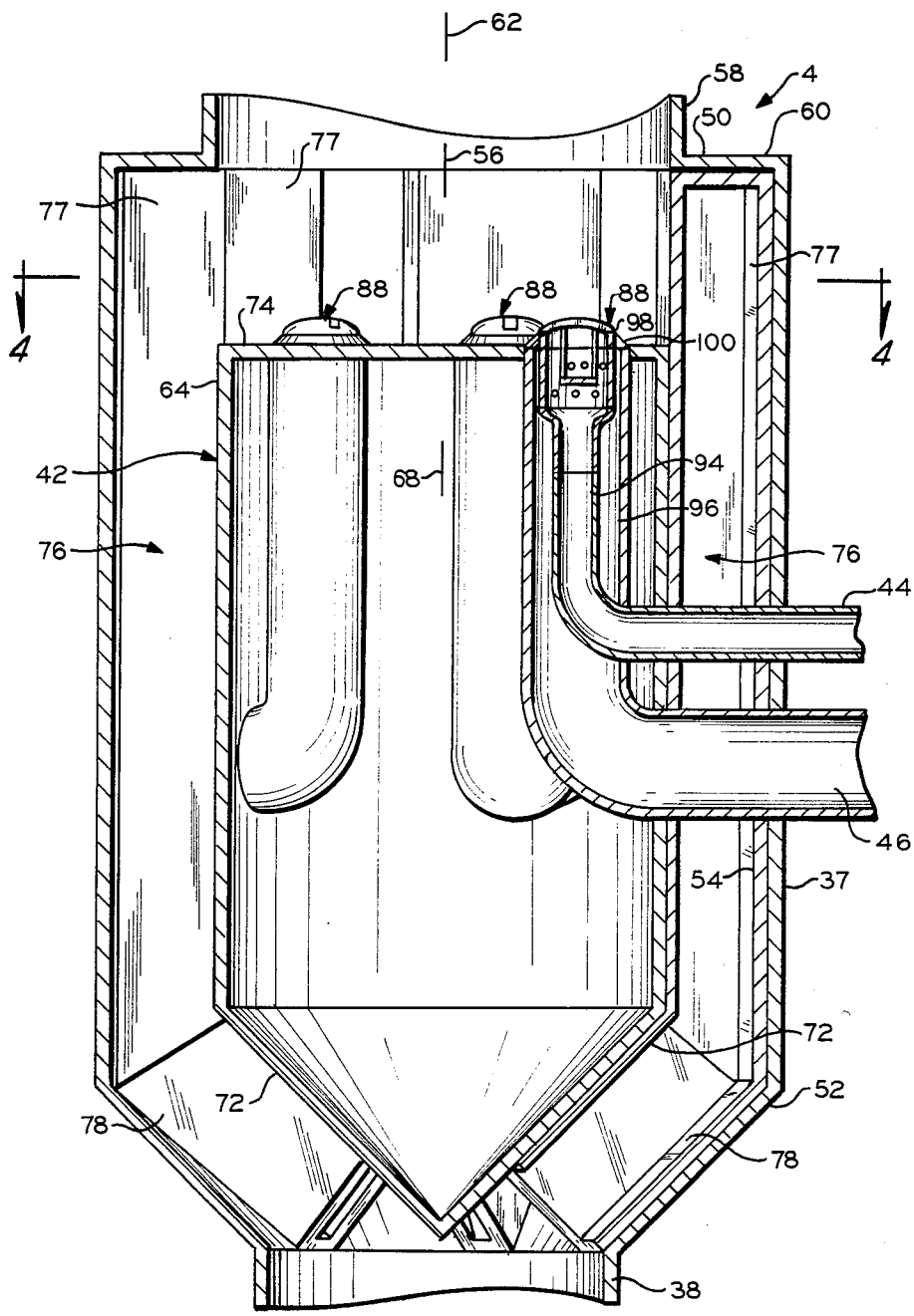
FIG. 2 is a cross-sectional view of the lift pot shown in FIG. 1.

Referring now to FIG. 2, the outer elongated member or lift pot 37 has an upper end 50, a lower end 52 and an interior surface 54. Preferably, the interior surface 54 is generally cylindrical in shape. The generally cylindrical interior surface 54 of the lift pot preferably defines a first diameter. The generally cylindrical interior surface 54 is centered about a longitudinal axis 56.

The riser-reactor 4 is connected to the upper end 50 of the lift pot 37. The riser-reactor 4 has a lower end 58 attached to the upper end 50 of the lift pot. The lower end 58 of the riser-reactor 4 defines a mouth having a second diameter where it is connected to the lift pot 37. The second diameter of the mouth of the riser-reactor is preferably less than the diameter across the interior surface 54 of the lift pot. Preferably, the upper end 50 of the lift pot is connected to the lower end or mouth 58 of the riser-reactor by an end wall 60, the interior surface of which is preferably generally annular shaped. End wall 60 serves to direct catalyst flow in an inward, radial or horizontal direction, as will be described below. The riser-reactor has a longitudinal axis 62 in its lower portions which is preferably coaxial with the longitudinal axis 56 of the lift pot 37.

The nozzle assembly 42 comprises an inner hollow elongated member, hereinafter called a cartridge (or plug) member 64, and nozzles 88 which serve as means for releasing a liquid oil feedstock into the riser-reactor 4. The cartridge member 64 has a longitudinal axis 68 and is generally rotationally symmetric about its longitudinal axis 68. Preferably, the longitudinal axis 68 of the cartridge member 64 is coaxial with the longitudinal axis 62 of the lower portions of the riser-reactor 4 and more preferably is also coaxial with the longitudinal axis 56 of the lift pot 37. The cartridge member 64 is positioned within the interior of lift pot 37. A lower end 72 of cartridge member 64 is preferably of a generally conical shape as shown. Also, the lower end 72 is closed. An upper end surface 74 of the cartridge member 64 faces the mouth 58 of the riser-reactor 4. Preferably, the upper end surface 74 is generally planar. The cartridge member itself is preferably generally cylindrically shaped. Preferably, the upper end surface 74 of the cartridge member 64 has a diameter near that of the mouth of the riser-reactor. Generally speaking, the diameter of the upper end surface 74 will be between 0.7 and about 1.5 times the diameter of the mouth of the riser-reactor. More preferably, the diameter of the upper end surface 74 of the cartridge member ranges from about 0.7 to about 1.10 times the diameter of the mouth of the riser-reactor.

The lower end 52 of lift pot 37 is preferably frustoconical in shape such that the lower mouth of lift pot 37 is smaller in diameter than the upper mouth. As shown, one end of catalyst inlet conduit 38 is connected to the lower end 52 of lift pot 37. Therefore, catalyst flowing through catalyst inlet conduit 38 may pass into lift pot 37.

As discussed above, cartridge member 64 is positioned within lift pot 37. Thus, a space, in this case generally annular in shape, is defined between the interior surface of lift pot 37 and the outer surface of cartridge member 64. Mounted within this space are a plurality of filler elements 76, each element having an upper portion 77 and a lower portion 78. Each lower portion 78 has a longitudinal axis which forms an angle with respect to the longitudinal axis of its respective upper portion. In the illustrated embodiment, five filler elements are provided, two of which are not shown in the cross sectional view of FIG. 2. Additionally, although five elements are included in the illustrated embodiment, any number of elements could be employed in order to occupy volume within the space defined between lift pot 37 and cartridge 64.

Preferably, each filler element 76 is a hollow elongated member having opposite faces. One face is attached, for example, by a weld, to the interior surface of lift pot 37, whereas the other face is attached to the outer surface of cartridge 64. As shown, each filler element lower portion 78 extends into the portion of the above-mentioned space which is defined between the conical lower end 72 of cartridge 64 and the lower end 52 of lift pot 37. Since each filler element is mounted between lift pot 37 and cartridge 64, the filler elements act to support cartridge 64. The filler elements 76 may be mounted, as shown, so as to be equidistantly spaced from another. In addition, each filler element 76 is preferably positioned within the space such that its upper portion's longitudinal axis is generally aligned with the longitudinal axis of lift pot 37.

In the preferred arrangement shown, each filler element substantially extends from the lower end to the upper end of lift pot 37. Extension of the filler elements above the upper end 74 of cartridge 64 is preferred partially because this provides for effective channeling of catalyst flow across the upper end of cartridge 64, as will be explained in more detail below. As an additional preferred feature, each filler element lower portion 78 is beveled such that the element tapers down to a lowermost end which has a smaller cross sectional area than the upper portion 77.

More specifically and most preferably, the lower end 78 is beveled or tapered such that cross sectional flow area within lower end 52 of lift pot 37 is substantially constant, and wherein this cross sectional flow area within lower end 52 is substantially equivalent to the flow area within the cylindrical portion of lift pot 37. Maintaining such a cross-sectional flow area assists in maintaining a relatively constant fluidized catalyst velocity while flowing through the lift pot.

An oil feedstock feed line 44 and an atomizing fluid feed line 46 are provided for conducting oil feedstock and an atomizing fluid, such as steam, therethrough from sources of oil and atomizing fluid. As shown, each feed line passes through the side wall of lift pot 37, through a filler element 76, and into the interior of cartridge 64 where the feed lines deliver oil and atomizing fluid to nozzle 88. Each of the bifluid nozzles 88 comprises an inner tube 94 and an outer tube 96. The inner tube 94 is preferably coaxially positioned within the outer tube 96. The end 98 of the inner tube 94 protrudes past the end 100 of the outer tube 96. The end 100 of the outer tubular member 96 is preferably positioned about flush with the upper end surface 74 of the cartridge member 64. The end 98 of the inner tubular member 94 preferably protrudes slightly above the upper end surface 74 of the cartridge member 64.

Figure 3:
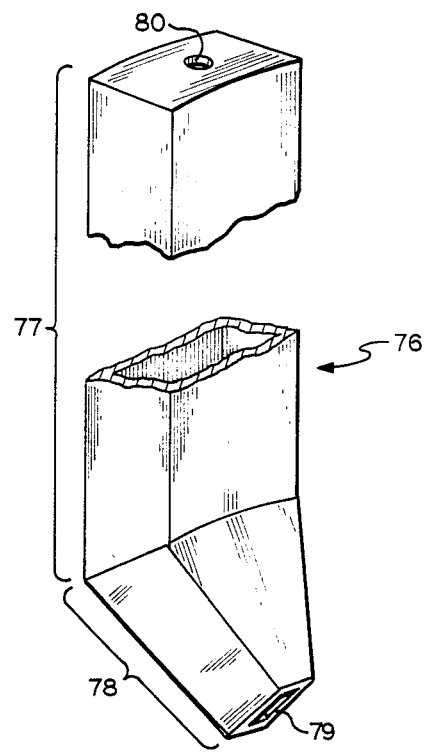
FIG. 3 is a perspective view of a filler element employed in the lift pot.

Turning now to FIG. 3, a perspective view is shown of filler element 76 which is constituted by upper portion 77 and lower portion 78. Filler element 76 has a cross section resembling a section of an annular ring. This particular shape is used in the illustrated embodiment primarily so that opposing faces conform to the generally cylindrical surfaces of lift pot 37 and cartridge 64. It is emphasized, however, that filler element 76 might have a variety of cross sectional shapes dictated by the shapes of lift pot 37 and cartridge 64, the desired catalyst flow area, and other design considerations. Preferably, each filler element 76 has an opening 79 at its lower end and an opening 80 at its upper end. Steam from a steam source (not shown) may be injected at opening 80 and flow out opening 79 so as to avoid catalyst and any coke accumulations on the interior of filler element 76. This steam flow also serves to cool filler element 76 and help avoid structural damage. In addition, filler element 76 may be any suitable hard metal, preferably steel, which is typically covered with a refractory material such as insulcrete (not shown). This refractory covering is usually put in place after mounting of the filler element within the apparatus. It should also be understood that all components previously described exposed to hot catalyst flow are similarly covered with a refractory material or an abrasion resistant metal.

Figure 4:
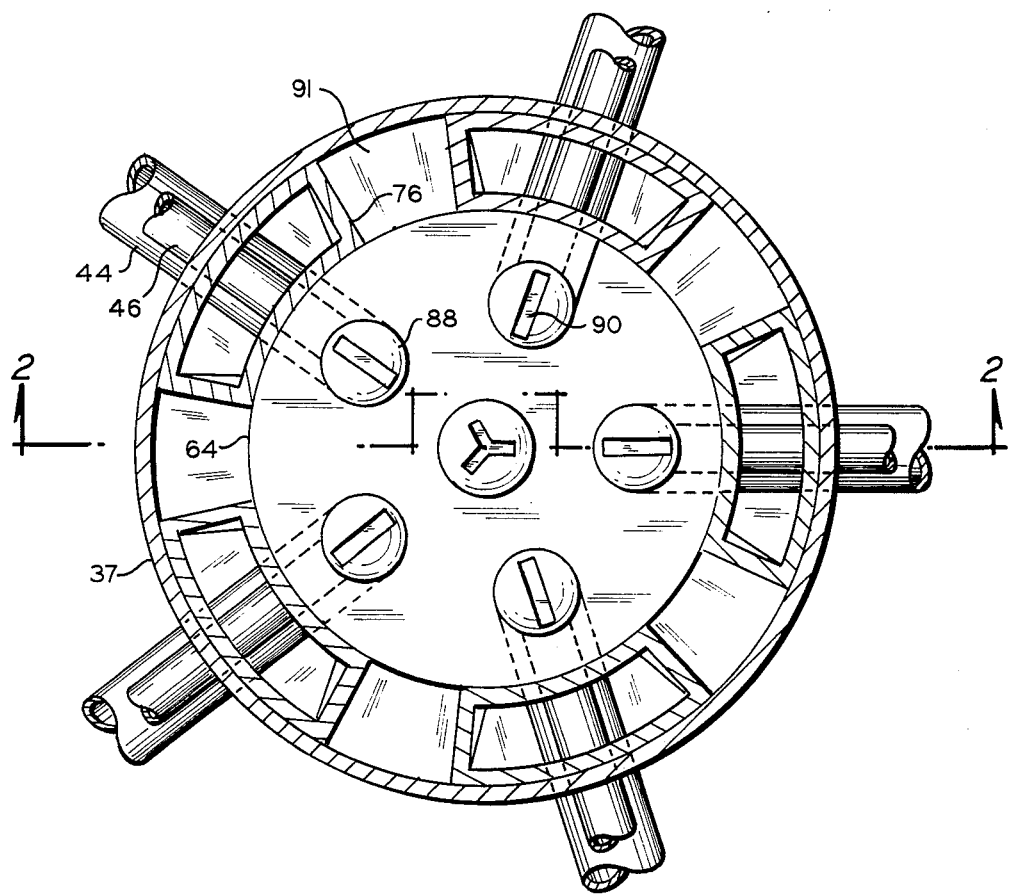
FIG. 4 is a cross-sectional view of the apparatus shown in FIG. 2 viewed along lines 4—4.

Referring now to FIG. 4, which is a cross-sectional view along lines 4—4 in FIG. 2, the nozzles 88 open the lift pot 37 from spaced apart positions on the upper end surface 74 of the cartridge member 64. Generally, from about 3 to about 12 of the bifluid nozzles are preferably circumferentially spaced around the longitudinal axis 68 of the cartridge member 64 and at least one nozzle is positioned on or very near the axis. The bifluid nozzles 88 are provided with slots 90 for the emission of a mixture of oil feedstock and atomizing fluid and the slots are preferably generally radially oriented with respect to the longitudinal axis 68 of the cartridge member 64. The nozzle on the axis helps to transport the catalyst into the riser.

Five filler elements 76 are shown as being mounted in the space between lift pot 37 and cartridge 64. Each filler element is preferably mounted to receive feed lines 44 and 46 therethrough such that each element 76 totally surrounds the feed lines in between lift pot 37 and cartridge member 64. Open areas 91 are defined between pairs of filler elements, and serve as flow areas or channels for hot catalyst. Preferably, the filler elements 76 are sized to give open area 91 cross-sectional flow areas which will maintain high enough velocities to maintain aerated or fluidized flow. The total cross-sectional open flow area between lift pot 37 and cartridge 64 must in actual practice, however, be kept above certain limits due to a variety of factors. If the total flow area is too small, an unacceptable pressure drop in the system may occur due to high catalyst velocity. This factor is dependent on the characteristics of the particular cracking apparatus employed. In addition, open areas 91 must be large enough to prevent plugging from wet or coked catalyst, broken insulation or other circulating trash.

Referring now to FIGS. 5 and 6, a wall member 104 connects the end 100 of the outer tube 96 to a sidewall 106 of the inner tube 94. The end 98 of the inner tube 94 is at least partially closed by a suitable end closure such as cap 108. The slot 90 is cut through the end closure 108 on the inner tubular member 94. The slot extends partially across the cap 108, preferably elongated diametrically across with respect to the tubular member 94. The sidewall 106 of the inner tubular member 94 is provided with a plurality of apertures 109 extending through the sidewall 106 and establishes a plurality of flow paths between the inside of the inner tubular member 94 and annulus 110 which is defined between the inner tube 94 and the outer tube 96 adjacent the second end 100 of the outer tube 96. For good results, the apertures 109 are preferably generally radially oriented with respect to a longitudinal axis 112 of the inner tubular member 94. The apertures 109 are in two separate rows staggered from row to row. To further enhance mixing, a plate baffle 114 can be positioned in the inner tubular member 94, preferably at right angles to the longitudinal axis 112 typically mounted by four support rods 115. A disc baffle coaxially mounted in the inner tubular member 94 is presently preferred. In use, it is preferred to connect the steam source to the annulus 110 between the inner tubular member 94 and the outer tubular member 96 and the source of oil feedstock to the inner tubular member 94. Although nozzles 88 are described herein as being of the bifluid type, shear or spray nozzles could also be employed.

According to another aspect of the present invention, the operation of the above described apparatus will now be described. Regenerated catalyst flows through catalyst inlet pipe 38 at a rate of, by way of example, about 20 to 40 tons per minute, and then enters the lower end 52 of lift pot 37. Hot catalyst particles flow around conical section 72 of cartridge 64, and through channels or open areas defined between pairs of filler elements 76. The hot catalyst particles, therefore, flow in a generally annular stream around cartridge 64 in a generally vertical direction, parts of this stream being blocked by filler elements 76. Since filler elements 76 occupy volume in the space defined between lift pot 37 and cartridge 64, the cross sectional flow area is less than in the case where the above-mentioned space is left entirely open, thereby giving a higher catalyst velocity. Also, since the filler elements 76 totally surround feed lines 44 and 46, feed lines are protected from the flow of hot catalyst particles. If these hot particles were allowed to contact the feed lines, an erosive effect would occur. The filler elements 76 also serve to protect feed lines 44 and 46 from excessive heat from the hot catalyst flow, thereby helping to prevent internal coking.

As the hot stream of hot catalyst approaches wall 60, the catalyst flow is directed by wall 60 so as to flow inwardly, the catalyst being accelerated in a generally radial or horizontal direction across upper end 74 of cartridge 64. Horizontal catalyst velocity achieved is, by way of example, about 5 to about 20 ft/second. Oil feedstock and atomizing fluid are released from nozzles 88 into lift pot 37.

Since the filler elements 76 extend to the top of lift pot 37 in the illustrated and preferred arrangement, the catalyst particles are guided between pairs of filler elements such that catalyst tends to flow between nozzles 88. This ensures that a maximum surface area of sheets of oil being sprayed from nozzles 88 is contacted with catalyst. Catalyst particles therefore mix with the oil feedstock, the mixture then passing into riser-reactor 4 where the cracking process continues.

Due to the high horizontal catalyst velocity achieved with the present invention, very effective mixing of catalyst and oil is achieved. The horizontal catalyst velocity is high enough that catalyst flows well into the center of the lift pot. This enhanced mixing effect causes better contact with catalyst and oil, thereby enhancing the efficiency of the cracking process. The catalyst particles and oil are typically admixed in a weight ratio range of from about 4:1 to about 10:1.

EXAMPLE

The following table illustrates how the invention might be applied to a commercial cat cracker. Vertical catalyst velocities of about 7 ft/second and horizontal catalyst velocities of about 10 ft/second can be expected according to this calculated example.

TABLE I

| Item | Design |
|---|---|
| Charge Oil at 470° F. | |
| (25) Recycle Bottoms | 9,300 BPD |
| Density | 11° API |
| (45) Hydrotreated Topped Crude | 47,500 BPD |
| Density | 20° API |
| Atmos. tower side draw gas oil | 2,500 BPD |
| Density | 33° API |
| Riser Steam Added at 470° F. | |
| (43) +(46) | 40,000 lb/hr |
| (13) Stripping steam at 470° F. | 500 psig |
| (43) 366° F. lift steam | 1,800 lb/hr |
| (38) Regenerated Catalyst at 1280° F. | 40 ton/min |
| (30) Air for Regeneration | |
| Rate | 960,000 lb/hr |
| Temperature | 440° F. |
| Pressure | 55 psia |
| (6) Regenerator | |
| Pressure | 48 psia |
| Temperature | 1280° F. |
| Diameter | 49 ft |
| Length | 110 ft |
| (4) Riser-reactor (in sections above lift pot) | |
| (a) cylinder length | 10 ft |
| Diameter | 40 in. I.D. |
| (b) Cone, length | 34 ft. 7 in. |
| Diameter (upper end) | 50 I.D. |
| (c) Cylinder, length | 103 ft. 9 in. |
| Diameter | 50 in. I.D. |
| (38) Regenerated catalyst inlet conduit | 31.6 in. I.D. |
| (37) Lift pot cylinder, diameter | 64 in. I.D. |
| Total height | 79.65 in. |
| Lift pot lower section 52, vertical height | 12 in. |
| (64) Cartridge, diameter | 40 in. O.D. |
| Height | 52 in. |
| Cartridge lower conical section 72, lower tip forms right angle | |
| Distance from upper end surface 74 to end wall 60 | 10.9 in. |
| (76) Filler elements | |
| Angle blocked off by each element | 43.23° |
| Width of opening 79 | 1.24 in. |
| Cross-sectional area of each element | 1.13 sq.ft. |

TABLE I-continued

| Item | Design |
|---|---|
| (91) Open areas | |
| Angle covered by each open area | 28.77° |
| Total cross-sectional flow area between lift pot and cartridge | 5.44 sq. ft. |
| (66) 6 nozzles in structure with insulation around nozzles and insulcrete cover. Tips of nozzles exposed | |
| (90) Outer nozzles - center distance to outer edge of top diameter | 7 in. |
| Center distance to structure center | 13 in. |
| (94) Inner oil pipe (nominal size)-(in) | 4 diverging to 6 I.D. |
| (96) Outer steam pipe | 8 inches |
| (90) Slot length 2.6 inches | |
| (109) ½ inch diameter holes - 2 rows with 16 holes–9 holes in bottom row and 7 holes in top row with staggered holes from row to row | |
| (114) ½ inch by 3.1 inch disc impingement baffle supported by at least four ½ inch diameter (item 115) compression rods welded to inside of weld cap (108) | |
| (108) 7 in. outside diameter weld cap, extra hard face inside and out (Stellite #1) cut 2.6 in. wide slot for full 7-inch length top | |
| (106) Longitudinal distance on nozzle | |
| (a) from weld on 6 in. I.D. to first row of holes | 1.5 inches |
| (b) from first row to second row of holes | 2 inches |
| (c) from second row to weld cap end | 1.5 inches |
| (d) from weld cap end to slot bottom | 1.6 inches |

Although the apparatus shown in FIGS. 2-7 is described in the environment of a cat cracker for mixing fluidized catalyst and oil, this apparatus could be employed wherein a need arises to effectively mix a fluidized solid and a fluid.

Obviously many modifications and variations of the present invention are possible in light of the above teachings. It is therefore to be understood that within the scope of the appended claims the invention may be practiced otherwise than as specifically described.

What is claimed is:

1. An apparatus comprising:
   (a) an outer hollow elongated member having an upper end, a lower end, and an interior surface;
   (b) an inner elongated member having an upper end, a lower end and an outer surface, said inner member being mounted within said outer member so as to extend axially into said outer member from the lower end of said outer member, a space being defined between the interior surface of said outer member and the outer surface of said inner member;
   (c) a plurality of filler elements within said space so as to define a limited flow path within said space;
   (d) means for introducing a fluidized solid into said space at the lower ends of said members;
   (e) means for directing the fluidized solid across the upper end of said inner member;
   (f) means for releasing a fluid into said outer member from the upper end of said inner member.

2. An apparatus as recited in claim 1, wherein each said filler element has two opposing faces, one face being attached to the interior surface of said outer member, the other face being attached to the outer surface of said inner member.

3. An apparatus as recited in claim 2, wherein each said filler element is elongated.

4. An apparatus as recited in claim 3, wherein said outer member has a longitudinal axis, and wherein a portion of each said elongated filler element has a longitudinal axis which is generally aligned with the longitudinal axis of said outer member.

5. An apparatus as recited in claim 4, wherein said elongated filler elements are equidistantly separated from one another.

6. An apparatus as recited in claim 5, wherein the upper end of said outer member extends above the upper end of said inner member.

7. An apparatus as recited in claim 6, wherein each said element extends substantially from the lower ends of said members to the upper end of said outer member.

8. An apparatus as recited in claim 7, wherein said means for directing the fluidized solid is a wall member connected to the upper end of said outer member, said wall member extending toward the longitudinal axis of said outer member.

9. An apparatus as recited in claim 8, further comprising a conduit, one end of said conduit being connected to said wall member such that fluid and fluidized solid can flow into said conduit.

10. An apparatus as recited in claim 9, wherein said means for releasing the fluid comprises a plurality of nozzles mounted within said inner member.

11. An apparatus as recited in claim 10, further comprising a plurality of fluid feed lines for passing fluid therethrough, each fluid feed line being in fluid communication with a particular nozzle.

12. An apparatus as recited in claim 11, wherein each said fluid line passes through an elongated element and into the interior of said inner member such that said element totally surrounds said fluid line between said inner member and said outer member.

13. An apparatus as recited in claim 12, wherein said means for introducing the fluidized solid is a solid inlet conduit having one end connected to the lower end of said outer member.

14. An apparatus as recited in claim 13, wherein the lower end of said inner member is generally conical in shape, and the lower end of said outer member is generally frustoconical in shape.

15. An apparatus as recited in claim 14, wherein each said filler element includes an upper portion and a lower portion, each portion having a longitudinal axis, wherein said lower portion longitudinal axis forms an angle with respect to the longitudinal axis of said upper portion.

16. An apparatus as recited in claim 15, wherein said element lower portion is mounted between said inner member lower end and said outer member lower end.

17. An apparatus as recited in claim 16, wherein said element lower portion is beveled such that the cross-sectional area of said lower portion is less than the cross-sectional area of said upper portion.

18. An apparatus as recited in claim 17, wherein the fluidized solid is a catalyst and the fluid is oil feedstock and an atomizing fluid.

19. An apparatus as recited in claim 18, wherein said conduit is a riser-reactor.

20. An apparatus as in claim 19 further comprising a disengagement chamber at an upper end of the riser-reactor and a regenerator which is positioned between the disengagement chamber and the inlet conduit.

* * * * *